UNITED STATES PATENT OFFICE.

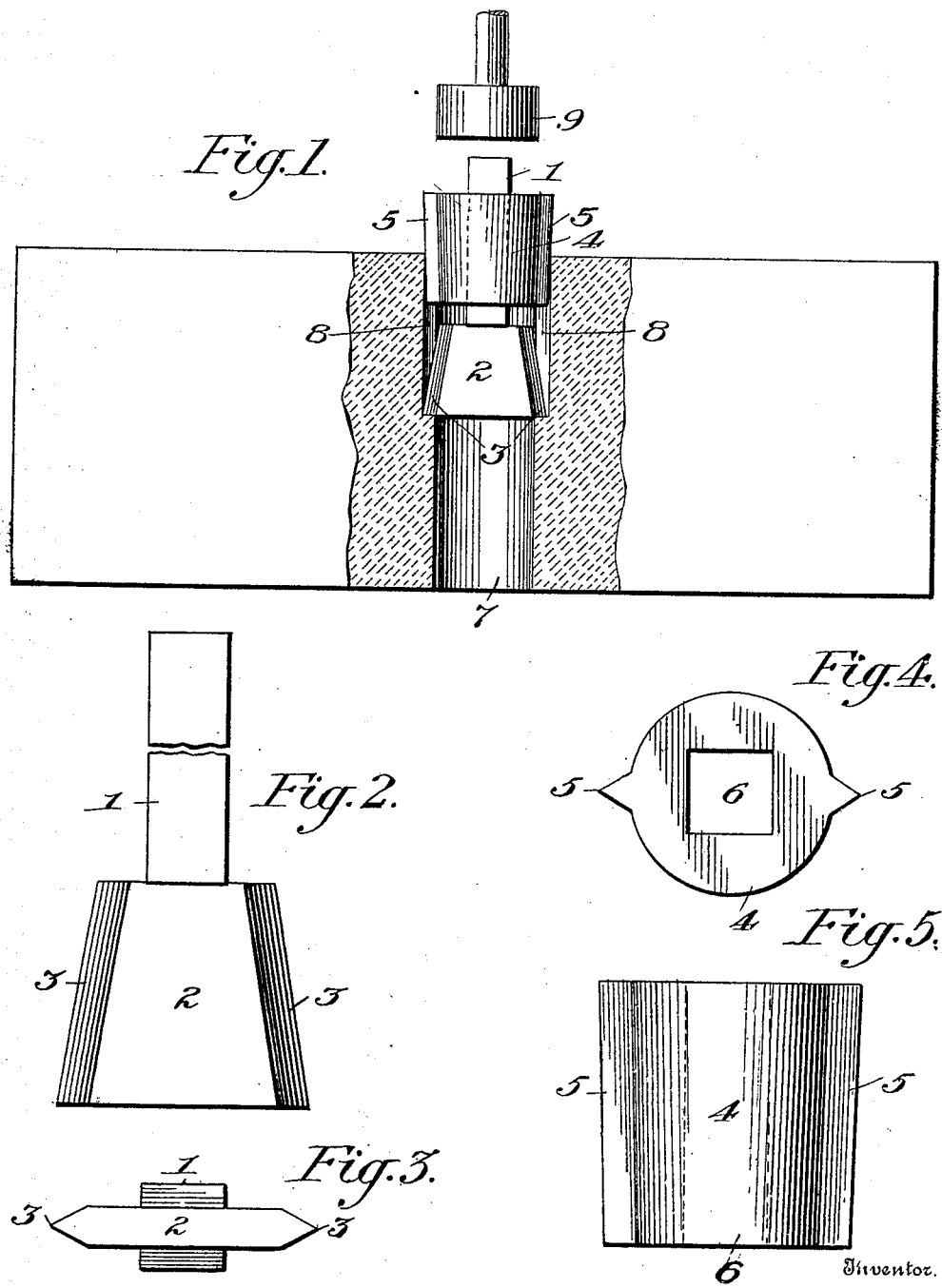

HUGH G. WILLIAMS, OF GRANVILLE, NEW YORK, ASSIGNOR OF ONE-HALF TO SAMUEL F. CULBERTSON, OF BALTIMORE, MARYLAND.

ROCK-DRILLING TOOL.

No. 912,925.      Specification of Letters Patent.      Patented Feb. 16, 1909.

Application filed November 10, 1906, Serial No. 342,825. Renewed October 2, 1907. Serial No. 395,524.

*To all whom it may concern:*

Be it known that I, HUGH G. WILLIAMS, a citizen of the United States, residing at Granville, in the county of Washington, in the State of New York, have invented a certain new and useful Improvement in Rock-Drilling Tools, of which the following is a full, clear, and exact description.

This invention relates to rock drilling tools, and particularly to tools for channeling drilled holes for purposes of blasting.

The object of the invention is to provide a channeling tool and a guide therefor of simple construction and effective in operation.

The invention consists in a rock-drilling apparatus comprising a channeling tool having a shank of polygonal cross-section and a cutting head having cutting edges tapering from its leading end toward the shank and a guide for said channeling tool consisting of a plug having ears adapted to engage initial channels in a drilled hole and provided with a polygonal opening for the shank of the channeling tool, all as I will proceed now more particularly to set forth and finally claim.

In the accompanying drawings, illustrating the invention, in the several figures of which like parts are similarly designated, Figure 1 is a side elevation of a portion of a rock, partially in section, showing the application of the invention in use. Fig. 2 is a side elevation, on a larger scale, of the channeling tool, with the shank broken. Fig. 3 is a bottom plan view, on a larger scale, of the channeling tool. Fig. 4 is a top plan view, on a larger scale, of the guide, and Fig. 5 is a side elevation, on a larger scale, of the guide.

The channeling tool comprises a shank 1 of square or any other desired polygonal shape in cross-section, and a broad, flat head 2, having cutting edges 3, tapering from its leading end toward the shank.

The guide is constructed as a plug or block 4 of metal or other suitable solid and strong material, of tapering form, and of a suitable size and shape to fit the usual hole commonly employed in blasting, and said block or plug is provided upon its exterior with longitudinal ears 5, preferably integral therewith, and corresponding substantially in shape with the cutting edges of the channeling tool. The plug or guide is also provided with a longitudinal opening 6, of square or other polygonal shape, corresponding with the shape of the shank of the channeling tool.

The operation of the invention is as follows:—A hole 7 being first drilled in a rock, as shown in Fig. 1, the channeling tool is used to cut initial channels 8 in the upper end of the hole to a sufficient depth to permit the placing of the guide upon the shank of the tool, with its ears 5 entering and fitting snugly the initially formed channels, and during the further driving of the channeling tool, said tool will be maintained in a perfectly straight position and prevented from turning or twisting as it is driven into the hole, and thus a perfectly alined channeling produced to effect the desired splitting or cracking of the rock when blasted. The guide being of tapering form, its smaller or lower end being of less diameter than the drilled hole, and the larger or upper end being of greater diameter than the drilled hole, allows it to enter only a portion of its length into the drilled hole, its upper end projecting a sufficient distance above the hole, whereby it may be removed by a hammer or other suitable device. When the channeling tool and guide have thus been placed in position and the shank of the tool projecting above the guide, the upper end of the shank may be effectually operated upon by a broad-headed hammer 9, as shown in Fig. 1, suitably connected with a steam or other power operated drilling apparatus.

When the depth of the channelings exceeds the length of the channeling tool and there is no more shank remaining above the guide to be operated upon by the hammer, and it is desired to continue the channelings, the guide and tool may be removed from the hole and a tool with a longer shank placed in the guide and again inserted in the hole, and any number of tools with shanks of different lengths may be provided for as many successive operations as may be necessary, and no matter how many changes are made, the tools will be maintained in a position to produce a straight channel from top to bottom of the hole.

I have herein shown the ears 5 of the guide arranged diametrically of the guide to correspond with the cutting edges of the channeling tool, but I wish to be understood as not limiting the invention to this particular arrangement of the ears and cutting edges, as the same may be varied according to the desired splitting or cracking of the rock to be effected by the channeling.

What I claim is:—

1. A guide for channeling tools, comprising a plug having a polygonal opening therethrough, and ears on said plug adapted to engage initially formed channels in a drilled hole.

2. A guide for channeling tools, comprising a plug having a polygonal opening therethrough, and integral ears on said plug adapted to engage initially formed channels in a drilled hole.

3. A guide for channeling tools, comprising a tapering plug having a longitudinal polygonal opening therethrough, and longitudinal ears on said plug adapted to engage initially formed channels in a drilled hole.

4. A channeling tool, comprising a polygonal shank and a head having channel-cutting edges, combined with a guide for said tool, comprising a tapering plug having a polygonal opening therethrough for the passage of said shank, and longitudinal ears on said plug corresponding with the cutting edges of said tool and adapted to engage channels initially formed in a drilled hole.

5. In combination with a tool having edges adapted to cut grooves on opposite sides of a drilled hole, a sleeve, fitting in said hole and surrounding the shank of said tool, the external shape of said sleeve being provided with projecting parts adapted to engage the stone around the said hole, preventing the said sleeve from turning in the latter.

6. A guide for channeling tools, comprising a plug having a longitudinal polygonal opening therethrough, and longitudinal ears on said plug adapted to engage initially formed channels in a drilled hole.

7. A channeling tool, comprising a polygonal shank and a head having channel-cutting edges, combined with a guide for said tool, comprising a plug having a polygonal opening therethrough for the passage of said shank, and longitudinal ears on said plug corresponding with the cutting edges of said tool and adapted to engage channels initially formed in a drilled hole.

In testimony whereof, I have hereunto set my hand this eleventh day of September, A. D. 1906.

HUGH G. WILLIAMS.

Witnesses:
E. L. WILLIAMS,
D. J. McHENRY.